United States Patent [19]
Banbury et al.

[11] Patent Number: 5,331,255
[45] Date of Patent: Jul. 19, 1994

[54] HIGH VOLTAGE POWER SUPPLY

[75] Inventors: John R. Banbury, Hants; David N. Jeenes, Devon, both of England

[73] Assignee: The Secretary of State for Defence in Her Britannic Majesty's Government of the United Kingdom of Great Britain and Northern Ireland, London, United Kingdom

[21] Appl. No.: 908,264

[22] Filed: Jul. 6, 1992

[30] Foreign Application Priority Data

Nov. 3, 1989 [GB] United Kingdom ............... 8924794

[51] Int. Cl.$^5$ .............................................. H01J 29/70
[52] U.S. Cl. ...................................... 315/411; 363/60; 348/730
[58] Field of Search .................... 315/411; 358/190; 363/60, 68

[56] References Cited

U.S. PATENT DOCUMENTS

| | | | |
|---|---|---|---|
| 3,584,287 | 6/1971 | Binoche | 321/15 |
| 3,872,370 | 3/1975 | Regnault | 317/3 |
| 4,041,366 | 8/1977 | Bauer | 363/61 |
| 4,167,035 | 9/1979 | Willard | 363/60 |
| 4,429,344 | 1/1984 | Whitman et al. | 361/303 |

FOREIGN PATENT DOCUMENTS 1368226 9/1974 United Kingdom .

OTHER PUBLICATIONS

International Search Report.

Primary Examiner—Theodore M. Blum
Attorney, Agent, or Firm—Nixon & Vanderhye

[57] ABSTRACT

An EHT power supply, for example for a cathode ray tube, having a voltage multiplier of a multi-stage Cockroft-Walton type, in which the capacitors of each stage are formed by layers of conducting material juxtaposed on either side of a layer of dielectric material, the layers of dielectric material forming an integral part of the mechanical structure of the multiplier and physically supporting the rectifier diodes of the multiplier. In one embodiment of the invention, the multiplier is formed as a closely-spaced stack in which each stage comprises a separate layer of dielectric material, and in another embodiment the capacitors of the AC side of the multiplier are formed on one layer of material and the capacitors of the DC side of the multiplier are formed on another layer, the two layers being disposable on opposite sides of the neck of a cathode ray tube with the successive stages being longitudinally disposed along the neck.

14 Claims, 5 Drawing Sheets

HIGH VOLTAGE POWER SUPPLY

BACKGROUND OF THE INVENTION

1. Field of the Invention

This invention relates to EHT power supplies suitable, for example, though not exclusively, for cathode ray tubes (CRTs) and in particular for miniature CRTs. Another potential application is for insulation testers and the like, in which small size and low stored charge are an advantage.

2. Discussion of the Prior Art

Such a power supply conventionally includes an oscillator, running at a frequency between, typically, 20 kHz and 50 kHz, a step-up transformer and a multiplier. One known type of multiplier suitable for this application consists of several rectifier stages cascaded together. Such a circuit is known as a Cockroft-Walton multiplier.

For CRT applications where the size and weight of the CRT and its associated power supplies are to be kept to a minimum, for example in the case of helmet-mounted CRT displays for use by aircrew, there is an advantage to be gained by raising the operating frequency of the oscillator to around 1 MHz so that smaller components (particularly for the capacitors in the Cockroft-Walton multiplier) may be used.

However, operating at such high frequencies incurs certain problems. In particular, the high voltage ceramic capacitors normally used in Cockroft-Walton multipliers are too lossy when operating in this frequency region and polyester capacitors of standard design have marginal performance with regard to their voltage rating.

SUMMARY OF THE INVENTION

This invention aims to overcome this problem and utilizes a multiplier of the Cockroft-Walton type having reduced size and weight and capable of operating without significant losses at frequencies of around 1 MHz or more, and whose capacitors are formed on an integral part of its mechanical structure.

Accordingly, this invention consists of an EHT power supply for a cathode ray tube characterized by including an oscillator and a power amplifier having a source-follower core driver circuit connected to a step-up transformer, the output of which is applied to the input of a voltage multiplier of a multi-stage Cockroft-Walton type, the capacitors of each stage of the multiplier being formed by areas of conducting material juxtaposed on either side of at least one layer of dielectric material, said layer or layers forming an integral part of the mechanical structure of the multiplier and physically supporting the rectifier diodes of the multiplier.

In a preferred embodiment, the power supply multiplier is formed as a closely-spaced stack, each stage of the multiplier comprising a separate layer of dielectric material and consisting of two capacitors and two diodes, one diode being connected between terminals of the two capacitors of the stage on the same side of the layer and the other diode being connected between terminals of the two capacitors on opposite sides of the layer.

This embodiment may be readily retained in a suitable potting compound, and the compact overlaying of the stages minimizes the stray EHT electric field and renders the power supply easy to place in a shielding box.

In one form of this embodiment, successive stages of the multiplier are interconnected by electrical contacts made between adjacent capacitor terminals.

The power supply may be separate from the CRT and be connected to it by EHT lines; alternatively the layers of dielectric material may be disposed transversely and identically about the neck of the tube, thus providing a light-weight and space-saving high-voltage supply for a CRT.

In a different embodiment of the invention, the capacitors of the AC side of the multiplier are formed on a first single layer of dielectric material and the capacitors of the DC side of the multiplier are formed on a second single layer of dielectric material, said two layers being disposable along opposite sides of the neck of the CRT with successive stages of the multiplier being disposable generally longitudinally to one another with respect to said neck.

The step-up transformer, which may be of toroidal construction having a split nickel-zinc ferrite core, may conventionally feed an end stage of the multiplier. Alternatively, especially in view of the small size and low capacitance of the transformer, it is possible to provide a center-feed to the multiplier, improving both ripple voltage and under-load regulation characteristics. The latter arrangement would be most advantageous if the multiplier is provided as part of a unit separate from the CRT.

In either type of feed, the capacitors of the first stage or the stages on either side of the feed point preferably have a value substantially higher than the capacitors of the subsequent stages. The transformer may be conveniently located, for example at the end of the neck of the CRT or against the side of the rear end of the CRT neck, between the AC and DC sides of the multiplier.

With the latter embodiment especially, a plurality of output tappings to different terminals of the CRT may be provided, for example in a tube design which uses a high-voltage first anode in conjunction with a lower focus voltage. The small change in grid cut-off voltage as the first anode voltage varies with screen current can be compensated in the video drive circuit.

Where it is desired to reduce the residual ripple voltage at the output from the power supply, a resistor may be connected in series with the output lead to the CRT EHT connector. Because of the very high operating frequency, a relatively small resistance value is sufficient in view of the efficient attenuation provided by the CRT-to-ground capacitance.

Preferably, the capacitor plates are copper or silver, bonded to mica. In addition to its good insulation properties, mica exhibits low dielectric loss at high frequencies. Capacitors constructed in this way are therefore less prone to failure than are conventionally-constructed capacitors.

The multiplier may be used as part of a fixed voltage supply, for example for the focus or final anode of a miniature CRT, or as part of a switchable focus supply for a penetron tube.

BRIEF DESCRIPTION OF THE DRAWINGS

Some embodiments of the invention will now be described, by way of example only, with reference to the drawings of which.

DETAILED DISCUSSION OF PREFERRED EMBODIMENTS

Figure 1:
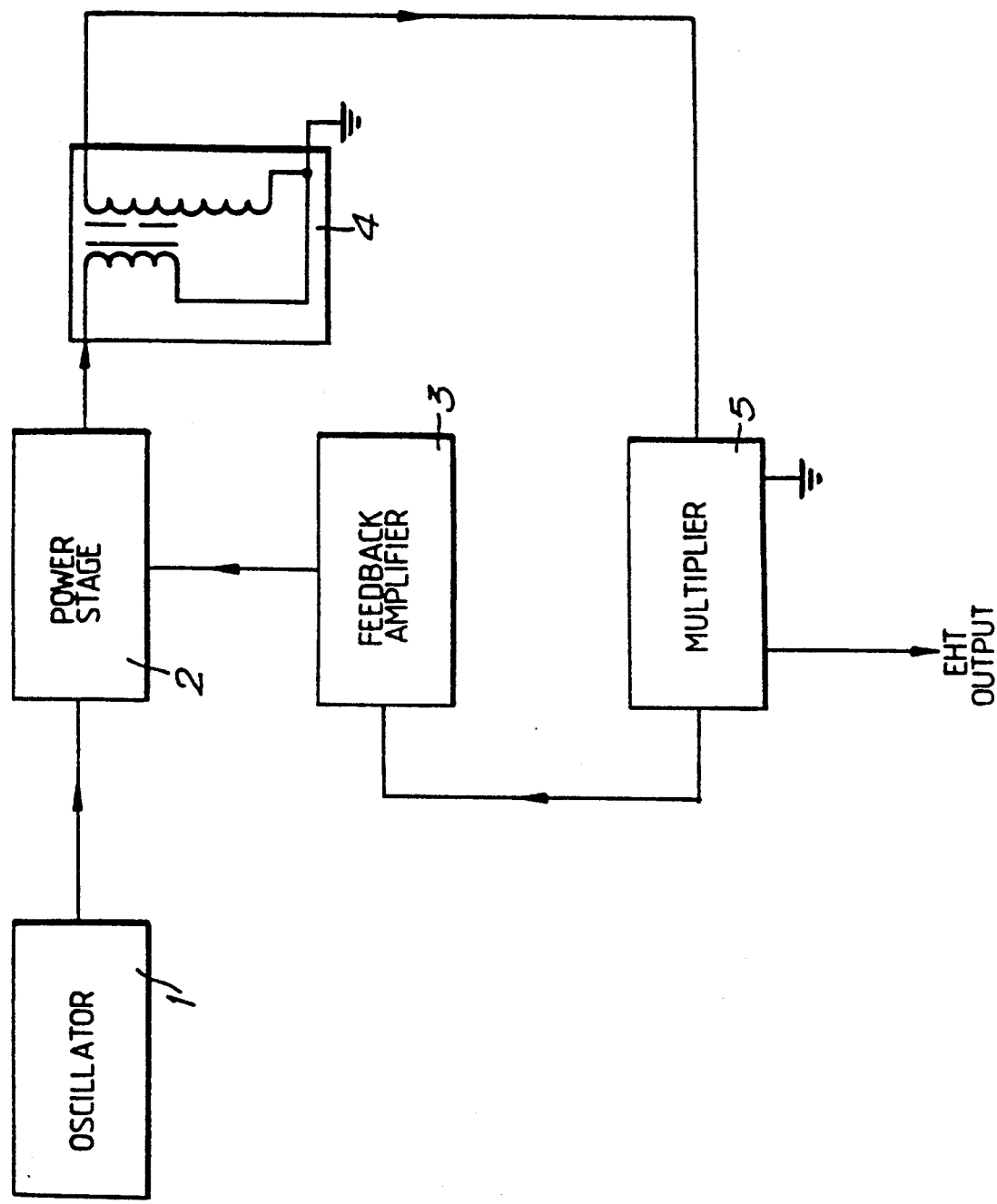
FIG. 1 is a block diagram of a conventional layout of an EHT supply for use with a CRT.

The EHT supply of FIG. 1 comprises an oscillator 1 operating at 1 MHz and consisting of an astable multivibrator, a power stage 2, a feedback amplifier 3, a step-up transformer 4 and a multiplier 5 of the Cockcroft-Walton type and constructed in accordance with the invention. Although the layout of FIG. 1 is conventional, because of the high operating frequency (compared with known systems), it is necessary for the power stage and step-up transformer (in addition to the oscillator and multiplier) to have modified characteristics. In particular, the core of the transformer 4 is chosen so that losses at the operating frequency are at least tolerable. A suitable core material is nickel-zinc ferrite in toroid form. The toroid is split in two (in accordance with usual practice in order to avoid core saturation), the two halves being separated by a mica sheet which operates an an insulator and non-magnetic spacer. The resonant frequency of the core is at or above the operating fundamental frequency in order to prevent high dissipation. The greater the inductance and capacitance of the secondary winding, the lower the resonant frequency. The number of turns affects both the inductance and capacitance as does the permeability of the core and the arrangement of the windings. The toroidal geometry of this embodiment allows the secondary windings to be placed on the core neatly side by side in a single layer hence keeping capacitance to a low value. Winding this type of former may be done simply. The step-up ratio is made great enough so that the number of cascaded multiplier stages may be kept to a minimum within the constraints of the operating fundamental frequency. In this embodiment the primary has 8 turns and the secondary, 180.

The power stage 2 has a low output impedance necessary for driving the low-inductance core primary and comprises a source-follower core drive circuit.

Figure 2:
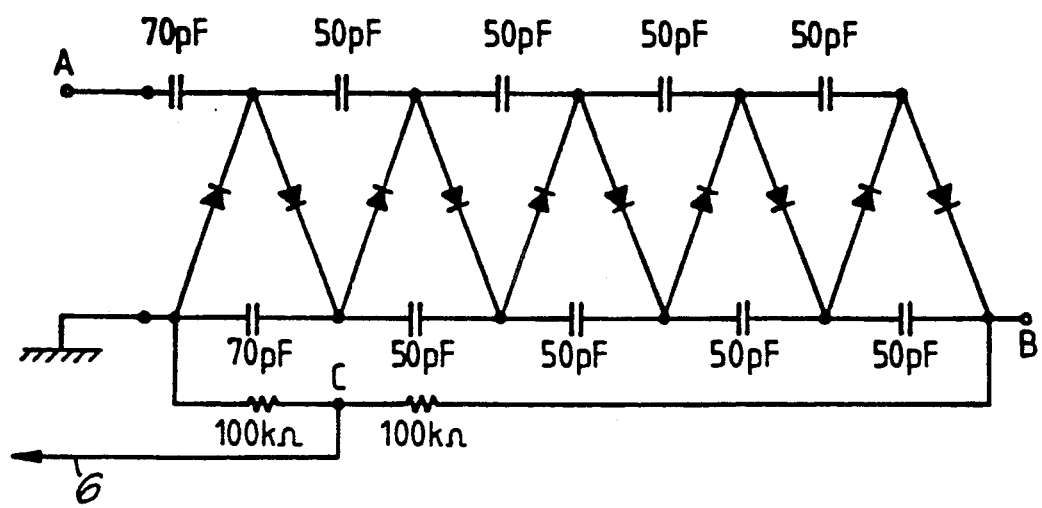
FIG. 2 is a circuit diagram of a five-stage Cockcroft-Walton type multiplier in accordance with the invention, suitable for use as part of an EHT supply for a CRT.

In FIG. 2, a multiplier comprises two banks of capacitors interconnected by diodes, and a potential divider for providing a low DC voltage source on line 6 for the feedback amplifier 3. There are five stages, each stage comprising two capacitors and two diodes. The number of stages is a matter of choice, depending on output voltage requirements. Connection to the step-up transformer 4 is made at point A (on the AC side) and to a CRT at point B (on the DC side). For good regulation, the two capacitors closest to the input side (A) are chosen to have a value somewhat higher than the rest; in this example, 70 pF compared with 50 pF. The diodes are chosen to have a high breakdown voltage in excess of 3 kV and a fast recovery time. Diodes of type SL500 (Electronic Devices Inc) having a breakdown voltage of 5 kV and a nominal recovery time of 100 ns are adequate for this purpose. An EHT supply incorporating the five-stage multiplier can provide a voltage output of 6 kV and a current capability of 500 $\mu$A.

For applications where lower currents are required, of the order of 100 $\mu$A for helmet-mounted displays for example, capacitors having values in the region of 15 pF can be employed satisfactorily at an operating frequency of 2 MHz.

Figure 3A:
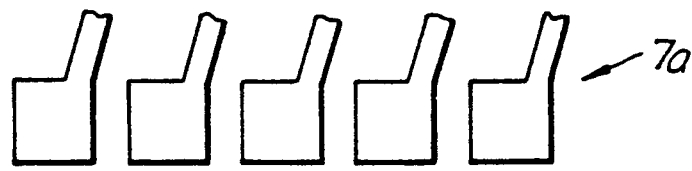
FIGS. 3a and 3b show the layout of capacitor plates which comprise the multiplier of FIG. 2.
Figure 3B:
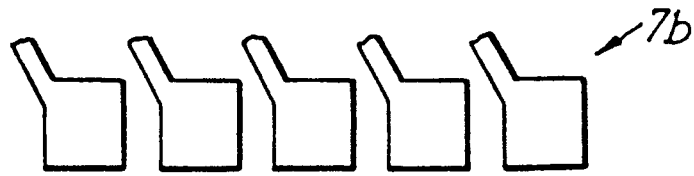
Figure 4:
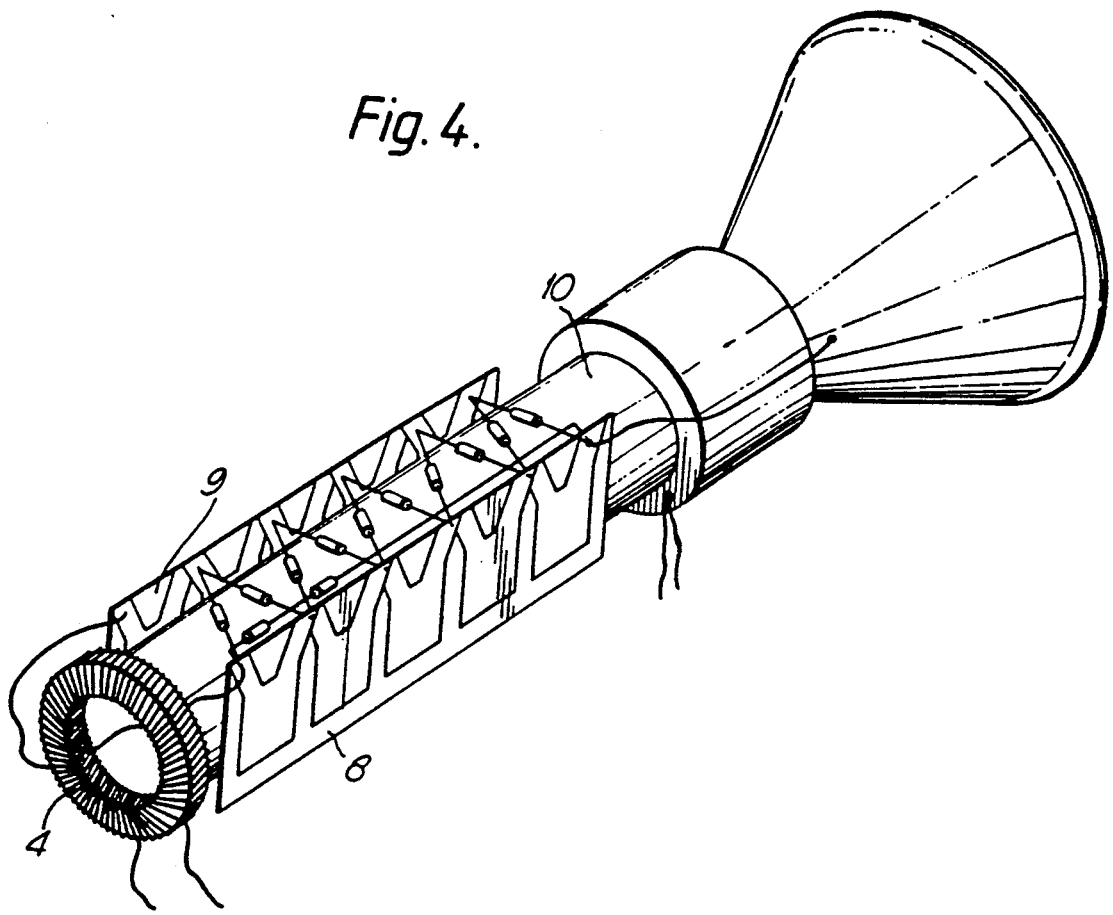
FIG. 4 is a perspective view of the multiplier of FIG. 2 positioned around the neck of a CRT and FIGS. 5 and 6 are alternative configurations of a multiplier in accordance with the invention.

Referring now to FIGS. 3a, 3b and 4, the multiplier of FIG. 2 is constructed using sheets of mica as the substrate for the constituent capacitors, one sheet per bank of capacitors. The mica sheets also contribute to the mechanical stability of the multiplier. Chemically etched copper sheets are used to produce capacitor plates 7a and 7b and mounting points for diodes and resistors. The capacitor plates 7a and 7b are bonded with adhesive to each side of a mica sheet to form one of two halves 8 and 9 of a multiplier. There are few commercially available adhesives which are suitable for this purpose, but those composed of methacrylate ester have been found to be adequate. The two halves are held together by the associated diodes and positioned either side of the neck of a CRT 10. The toroidal step-up transformer 4 is positioned at the extreme end of the neck of the CRT 10 and then the transformer and multiplier assembly is potted in silicone rubber to provide the necessary electrical insulation and mechanical stability. This configuration is particularly suited to use with helmet-mounted CRTs.

Figure 5:
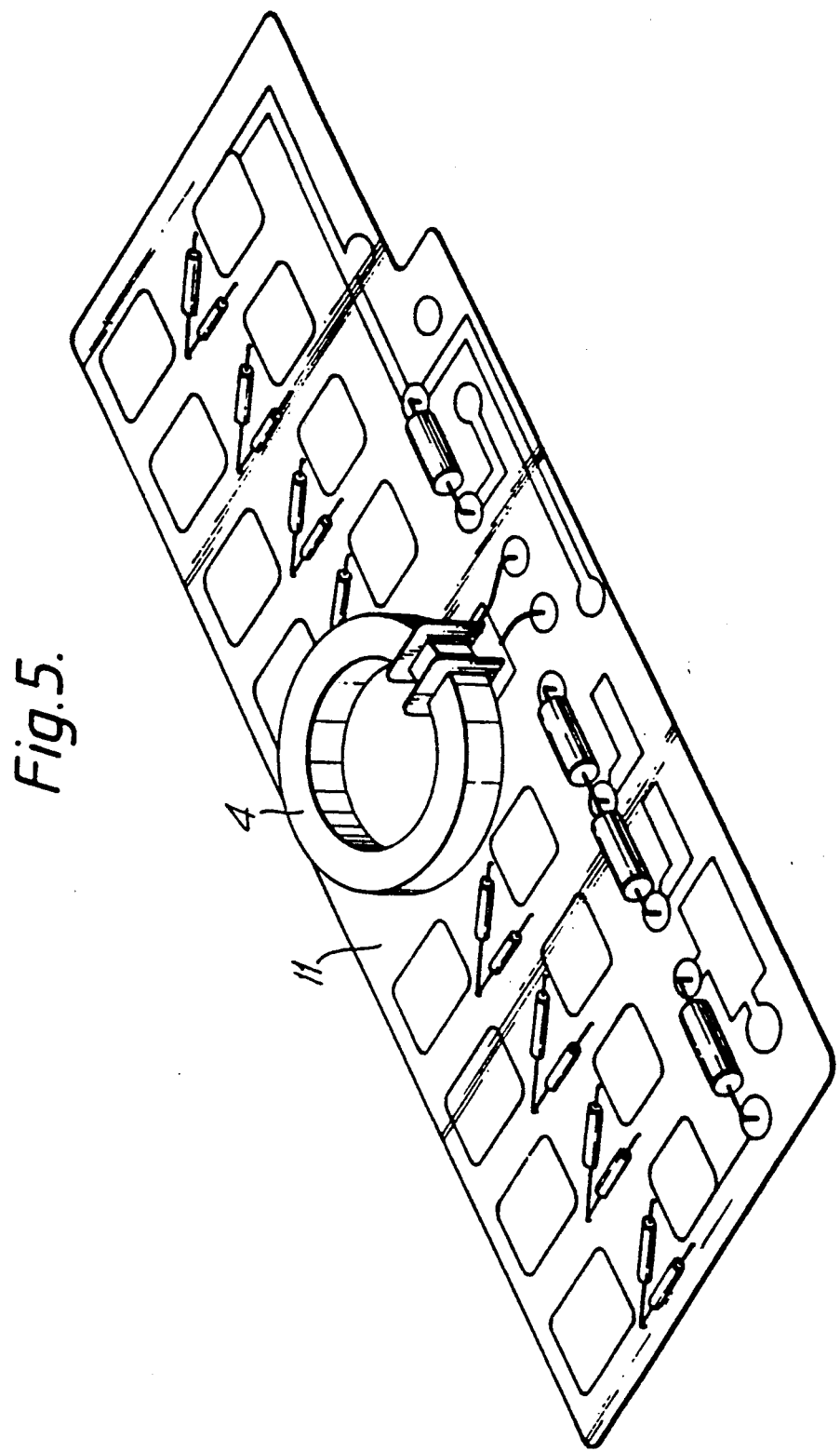

The alternative configuration of FIG. 5 where the multiplier is folded out flat may be more useful for flood-gun CRT or compact head-up display applications. Here, one common mica sheet 11 is used for the complete multiplier circuit and the transformer 4 is mounted thereon. FIG. 5 shows a centre-fed full-wave multiplier.

Figure 6:
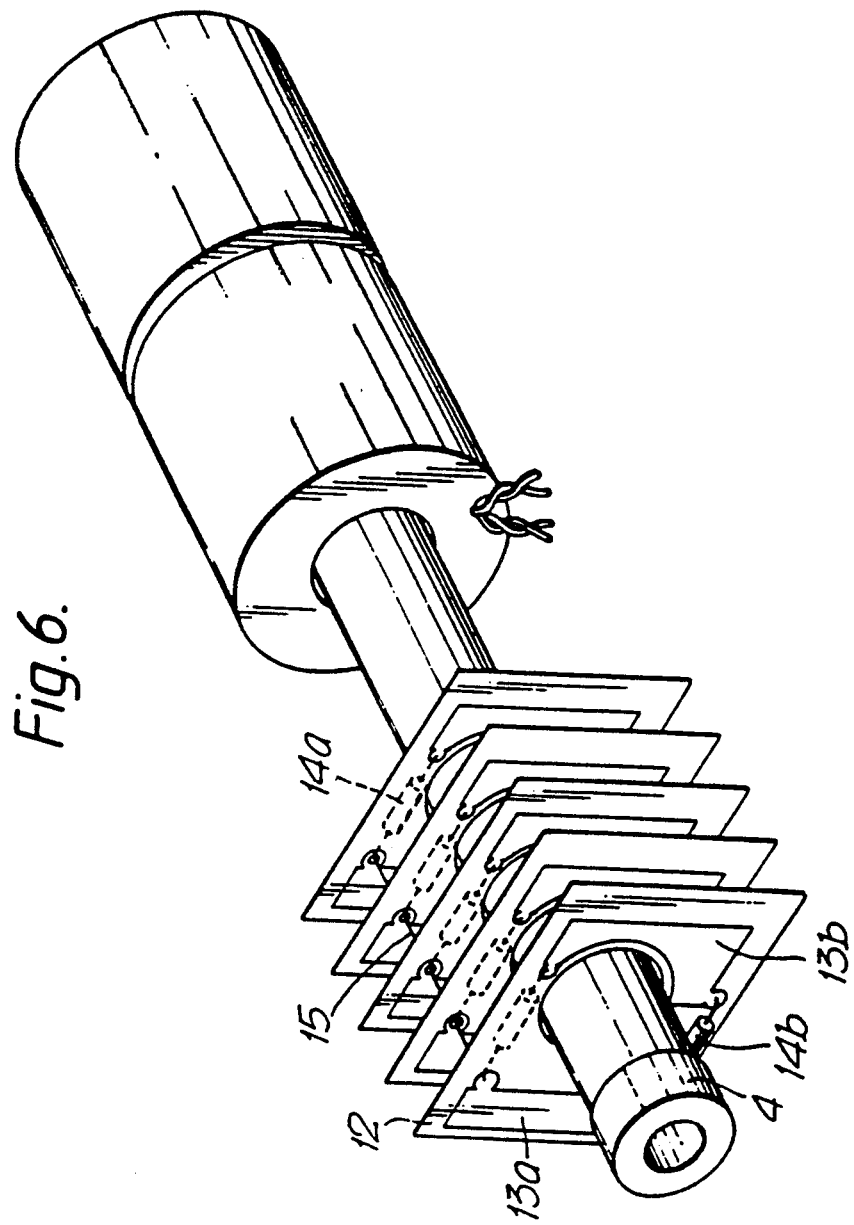

A significant reduction in the effects of multiplier stray capacity can be achieved using the alternative configuration of FIG. 6. This configuration consists of cascaded mica discs 12 placed around the CRT 10, each comprising one multiplier stage of two capacitors 13a 13b and two diodes (14a, 14b). This arrangement more readily lends itself to a centre-fed multiplier configuration. The gap between successive discs can be very small so that electrical connection may be made therebetween by means of spring-loaded contacts 15. The multiplier may then be potted around the CRT neck 10 (as shown) or, alternatively, potted and operated remote from the CRT, depending on the application. Either alternative provides a very compact arrangement.

The multipliers of FIGS. 4 and 6 could be alternatively configured to comprise two toroidal transformers positioned either side of the CRT neck 10. Preferably, they should be aligned co-axially so that the magnetic field in the region between them is a minimum. This measure will reduce interference on the EHT output. Both coils may supply all stages, or alternatively each coil may supply a different set of stages. In the latter case, two EHT output levels could be made available to feed, for example, the CRT screen and focus anode.

A multiplier constructed in accordance with the invention exhibits very good inherent regulation characteristics under load. Additionally, it has the advantages of good breakdown voltage rating, small size and weight.

In an alternative method of construction the capacitor plates are silver and made by use of silvered-mica capacitor fabrication techniques.

We claim:

1. An EHT power supply having a voltage multiplier of a multi-stage Cockroft-Walton type characterised in that the capacitors of each stage are formed by areas of conducting material juxtaposed on either side of a layer of dielectric material, said layers forming an integral part of the mechanical structure of the multiplier and physically supporting the rectifier diodes of the multiplier, wherein the multiplier is formed as a closely-spaced stack, each stage of the multiplier comprising a separate layer of dielectric material and consisting of two capacitors and two diodes, one diode being connected between terminals of the two capacitors of the stage on the same side of the layer and the other diode being connected between terminals of the two capacitors on opposite sides of the layer, wherein the layers are disposable transversely and identically about the neck of a cathode ray tube.

2. An EHT power supply having a voltage multiplier of a multi-stage Cockroft-Walton type characterised in that the capacitors of each stage are formed by areas of conducting material juxtaposed on either side of a layer of dielectric material, said layers forming an integral part of the mechanical structure of the multiplier and physically supporting the rectifier diodes of the multiplier, said multiplier having an input AC side and an output DC side, wherein the capacitors of the AC side of the multiplier are formed on a first single layer of dielectric material and the capacitors of the DC side of the multiplier are formed on a second single layer of dielectric material, said two layers being disposable along opposite sides of the neck of a cathode ray tube with successive stages of the multiplier being disposable generally longitudinally to one another with respect to said neck.

3. An EHT power supply having a voltage multiplier of a multi-stage Cockroft-Walton type characterised in that the capacitors of each stage are formed by areas of conducting material juxtaposed on either side of a layer of dielectric material, said layers forming an integral part of the mechanical structure of the multiplier and physically supporting the rectifier diodes of the multiplier, said multiplier having an input AC side and an output DC side, wherein the capacitors of the AC side of the multiplier are formed on a first single layer of dielectric material and the capacitors of the DC side of the multiplier are formed on a second single layer of dielectric material, said two layers being disposable along opposite sides of the neck of a cathode ray tube with successive stages of the multiplier being disposable substantially longitudinally to one another with respect to said neck.

4. An EHT power supply as claimed in claim 3 further characterised in that the multiplier circuit is centrefed by the step-up transformer (4).

5. An EHT power supply for a cathode ray tube, said power supply comprising:
an oscillator;
a step-up transformer having an output;
a power amplifier having a source-follower core driver circuit connected to said step-up transformer;
a voltage multiplier of a multi-stage Cockroft-Walton type having an input and rectifier diodes, said multiplier input connected to said step-up transformer output, each stage of said multi-stage multiplier having capacitors, said capacitors comprised of conducting material juxtaposed on either side of at least one layer of a dielectric material, said layer of dielectric material forming a mechanical structure of said multiplier and physically supporting said rectifier diodes of said multiplier.

6. An EHT power supply as claimed in claim 5 further characterised by having a plurality of output tappings suitable for connection to different terminals of the cathode ray tube.

7. An EHT power supply as claimed in claim 5 further characterised in that the capacitors forming the first stage or stages have a value substantially higher than the capacitors of the subsequent stages.

8. An EHT power supply as claimed in claim 7 further characterised in that the capacitors forming the first stage or stages have a value substantially equal to 70 pF and the capacitors of the subsequent stages have a value substantially equal to 50 pF.

9. An EHT power supply as claimed in claim 5 further characterised in that the dielectric material is mica.

10. An EHT power supply as claimed in claim 5 further characterised by including a step-up transformer (4) of toroidal construction having a split nickel-zinc ferrite core.

11. An EHT power supply as claimed in claim 5, wherein said oscillator comprises an oscillator operable at a frequency of at least 1 MHz.

12. An EHT power supply as claimed in claim 5, wherein said multiplier is formed as a closely-spaced stack, each stage of the multiplier comprising a separate layer of dielectric material and consisting of two capacitors and two diodes, one diode being connected between terminals of the two capacitors of the stage on the same side of the layer and the other diode being connected between terminals of the two capacitors on opposite sides of the layer.

13. An EHT power supply as claimed in claim 12, wherein successive stages are interconnected by electrical contacts made between adjacent capacitor terminals.

14. An EHT power supply as claimed in claim 12, wherein the layers are disposable transversely and identically about the neck of the cathode ray tube.

* * * * *